United States Patent
Smith

(10) Patent No.: US 8,014,392 B2
(45) Date of Patent: Sep. 6, 2011

(54) METHOD AND SYSTEM FOR ADVERTISING BLUETOOTH MULTICAST FEATURE

(75) Inventor: Sherry Smith, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 766 days.

(21) Appl. No.: 12/046,274

(22) Filed: Mar. 11, 2008

(65) Prior Publication Data
US 2009/0232041 A1    Sep. 17, 2009

(51) Int. Cl.
*H04L 12/28* (2006.01)
*H04J 3/26* (2006.01)
*G06F 11/00* (2006.01)

(52) U.S. Cl. ............... 370/389; 370/432; 714/746

(58) Field of Classification Search ............... None
See application file for complete search history.

(56) References Cited

U.S. PATENT DOCUMENTS

| | | | |
|---|---|---|---|
| 6,522,877 B1 * | 2/2003 | Lietsalmi et al. | 455/422.1 |
| 7,016,336 B2 * | 3/2006 | Sorensen | 370/351 |
| 7,269,388 B2 * | 9/2007 | Poursabahian et al. | 455/41.2 |
| 7,398,081 B2 * | 7/2008 | Moran | 455/414.1 |
| 2006/0018319 A1 * | 1/2006 | Palin et al. | 370/390 |

* cited by examiner

*Primary Examiner* — Nittaya Juntima
(74) *Attorney, Agent, or Firm* — McAndrews, Held & Malloy, Ltd.

(57) ABSTRACT

Aspects of a method and system for advertising a Bluetooth multicast feature are provided. A master device may provide a multicast service to active slave devices during a Bluetooth piconet connection. A Bluetooth multicast packet addressed to a specific slave device may be transmitted over a point-to-point connection. The multicast packet may be decoded and acknowledged by each of the slave devices on the piconet. The master device may re-transmit the multicast packet addressed to the specific slave device over the same point-to-point connection when an acknowledgment or response indicating a reception of the multicast packet from each of active slave devices may not be detected. The point-to-point connection may be associated with a L2CAP channel identified by a determined unique channel identifier (M-CID). The point-to-point connection may be secured by assigning a common authentication key shared among the slaves of the piconet.

26 Claims, 5 Drawing Sheets

METHOD AND SYSTEM FOR ADVERTISING BLUETOOTH MULTICAST FEATURE

CROSS-REFERENCE TO RELATED APPLICATIONS/INCORPORATION BY REFERENCE

Not Applicable.

FIELD OF THE INVENTION

Certain embodiments of the invention relate to wireless communication. More specifically, certain embodiments of the invention relate to a method and system for advertising Bluetooth multicast feature.

BACKGROUND OF THE INVENTION

Bluetooth is a short-range radio link intended to replace cables connecting portable or fixed wireless enabled devices. Bluetooth links may be formed within the context of a piconet and the Bluetooth devices within the piconet may frequency hop together. One Bluetooth device may act as a master of the piconet, whereas the other devices may act as slaves. Under current Bluetooth specification, up to 8 active Bluetooth devices may participate in a single piconet. Active member addresses (AM_ADDR) 1 to 7 may be assigned to the active slaves during the creating of the piconet. The AM_ADDR may identify the destination slave of a master transmission or the source slave of a slave transmission. Using time division multiplexing, time may be divided into slots of 625 μs in a piconet, and transmissions may be synchronized to a slot grid and controlled by the master. The master and slaves Bluetooth devices may alternate transmit opportunities in a time-division duplex (TDD) fashion. Time may be divided into slots of 625 us in the piconet. In particular, the master may transmit on available even numbered slots, as defined by the master's Bluetooth clock, while the slave may transmit on available odd numbered slots. A slave may transmit only after being polled by the master. Bluetooth support both a point-to-point connection and a point-to-multipoint connection in which the channel may be shared among several Bluetooth slave devices. In the point-to-multipoint connection, the Bluetooth master may simultaneously transmit to its active slaves at one time. Different frequency hopping sequences may be used for each piconet in a Bluetooth network.

Bluetooth supports various types of links, both Synchronous Connection-Oriented (SCO) transport and Asynchronous Connection-Less (ACL) transport. A SCO link may be a symmetric point-to-point link between a master and a single slave in the piconet. The SCO link may be used to carry voice applications. Three SCO packets may be commonly used, namely, HV1, HV2, and HV3. The master may send SCO packets to a slave at regular intervals (TSCO) in reserved master-to-slave slots. The ACL link may be a point-to-multipoint link between the master and the slaves participating in the piconet and may be mainly used to carry data communications. In the slots not reserved for SCO transport, the master may establish an ACL transport on a per-slot basis to any slave. Among the various packet types defined by Bluetooth baseband, DH1, DH3, DH5, DM1, DM3 and DM5 may be commonly used for the ACL transport. An ACL packet may have a maximum duration of one, three and five time slots respectively.

The security features of the current Bluetooth specification provide secure communication at the link level. Depending on user requirements and sensitivity of information involved, Bluetooth security may comprise authentication, authorization, and encryption. The authentication may ensure that a device seeking a connection may be indeed who it claims to be. The authorization may determine whether or not a requesting device may be allowed access to specific information or services. The encryption may ensure confidentiality by protecting private data from being viewed/decoded by unintended recipients. A Bluetooth device may encrypt its transmissions and ensure that only a recipient with a proper decryption key may view/decode the data. Further, the Bluetooth specification may allow for a whole piconet's traffic to be encrypted. This may be achieved by encrypting traffic with a common encryption key shared by the devices within the piconet. In that case devices in the piconet may eavesdrop traffic of the Bluetooth network including traffic not intended for them.

Bluetooth has become a standard for personal area networks connecting mobile devices including mobile phones, PDAs, laptop computers, headsets, keyboards and other devices. Although Bluetooth may commonly be used to connect one device to another device, Bluetooth may, for example, be utilized for transmitting data from a master device to multiple slave devices through a Bluetooth broadcast service. When a master may be broadcasting to all slaves of the piconet, the slaves receiving broadcast baseband ACL packets do not transmit in odd numbered slots. Some fields in the received broadcast baseband ACL packets such as FLOW, ARQN and SEQN may not have significant meaning and may be wasted during the Bluetooth broadcast service. Current Bluetooth broadcast feature may repeat transmitting (broadcasting) the same broadcasted baseband ACL packet to the multiple slave devices several times to increase the reliability of broadcast over an unreliable Bluetooth radio channel.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for advertising a Bluetooth multicast feature, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for advertising a Bluetooth multicast feature. Various aspects of the invention may provide an advertising Bluetooth multicast feature in which a master in a Bluetooth piconet may provide a multicast service to active slave devices during the piconet connection. In this regard, a Bluetooth multicast packet addressed to a specific slave device may be transmitted over a point-to-point connection. The master device may detect an acknowledgment or response indicating a reception of the multicast packet from each of active slave devices during the piconet connection. The multicast packet addressed to the specific slave device may be re-transmitted over the same point-to-point connection if an acknowledgment or response may not be detected from each of active slave devices during the piconet connection. The point-to-point connection may be an ACL link of a L2CAP channel identified by a determined unique channel identifier (M-CID). In this regard, the ACL link may be secured by assigning a common authentication key. The common authentication key may be shared among the slave devices during the piconet connection. In this regard, a payload of the transmitted multicast packet may be decoded by each of the active slave devices including those non-addressed slaves.

Figure 1:
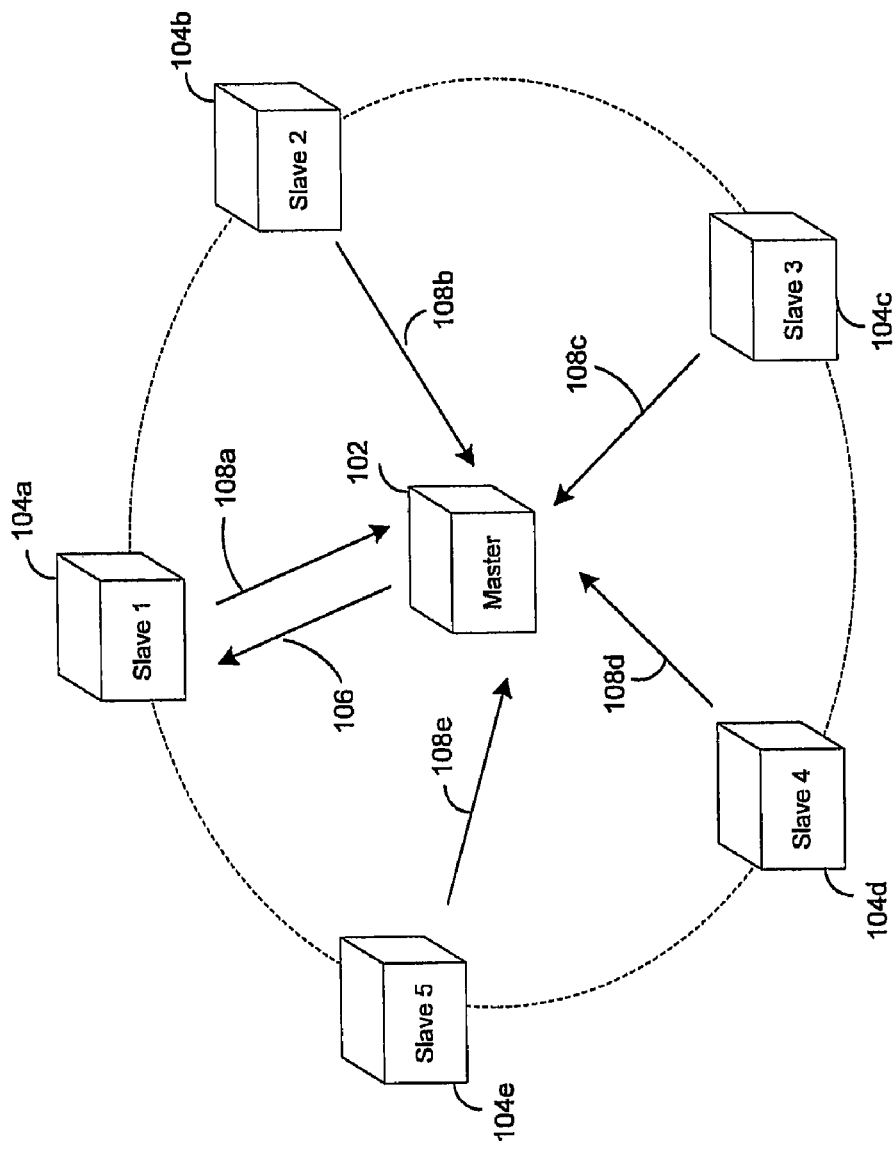
FIG. 1 is a block diagram that illustrates an exemplary Bluetooth piconet which may be utilized for advertising Bluetooth multicast feature, in accordance with an embodiment of the invention.

FIG. 1 is a block diagram that illustrates an exemplary Bluetooth piconet which may be utilized for advertising Bluetooth multicast feature, in accordance with an embodiment of the invention. Referring to FIG. 1, there is shown a master device 102 and a plurality of slave devices, which are collectively referenced as slave devices 104. The plurality of slaves may comprise slave devices 104a, 104b, 104c, 104d, and 104e.

The master device 102 may comprise suitable logic, circuitry and/or code that may be Bluetooth compliant and may be enabled to operate as the master device 102 in a piconet. The master device 102 may be integrated and/or communicatively coupled to a host device. Exemplary host devices may be a handheld communication device or a PC. The master device 102 may control and determine various operating aspects of the piconet. In this regard, the master device 102 may provide a multicast service to its active slaves 104. In this regard, the master device 102 may create a channel 106 which may be a logical connection between the master device 102 and a particular slave, for example, the slave 104a, to provide multicast packets to its active slaves 104. The created channel 106 may be identified by a multicast channel identifier (M-CID), which may be a determined unique channel identifier (CID). The M-CID may be vendor specific.

Before the channel 106 may be established, a link such as an ACL link may be setup between the master device 102 and the slave device 104a to support the channel 106. The ACL link may be secured by authentication and/or encryption. In this regard, a common authentication key /or an encryption key for the ACL link may be shared among the master device 102 and the slave devices 104 in the piconet. The authentication key, which may be called the link key in the Bluetooth specification, may be generated by enforcing the link key associated with the ACL link with a common link key such as the master link key of the piconet, or, by using a vendor specific way to make the point of the piconet to share the link key of the ACL link between the master device 102 and the slave 104a.

Following the authentication process, the ACL link may be further encrypted. Using the common authentication key, the master device 102 and the slave devices 104 may generate a sequence of encryption keys to encrypt their transmissions. The encryption key may change with each packet transmission. The encryption may apply to the payload of the packets. The packet headers may not be encrypted. In this regard, the slave devices 104 may be able to decipher the ACL packets on the ACL. In this regard, the destination slave, for example, the slave device 104a, of the master transmission may be identified by a temporary address in the AM-ADDR field of the ACL packet header. The ACL packet transmission may use a stop-and-go ARQ scheme. Each ACL packet may be acknowledged by an acknowledgement packet. The ACL packet may be retransmitted until a positive acknowledgment may be received or a timeout occurs. In this regard, the ACL packet transmitted from the master device 102 to the destination of the slave device 104a may be acknowledged by each of the slave devices 104 including those slaves not addressed by the ACL packet. The ACL packet may be re-transmitted until a positive acknowledgement may be received from each of the slave devices 104.

The master device 102 may schedule transmission opportunities for the slave devices 104 to respond the master device 102 in the preceding slots to acknowledge receptions of the ACL packet at the salves from the master device 102. In this regard, the master device 102 may assign opportunities of acknowledging the ACL packet only to the individual slave from which the master device 102 may not receive positive acknowledgment of the ACL packet. In this regard, the master device 102 may use a Flush Timeout to limit the retransmission. The Flush Timeout may be the maximum transmission time for the ACL packet and may be negotiated between the master device 102 and the slave 104a. In this regard, a threshold may be determined to limit the number of the retransmission of the ACL packet due to a negative acknowledgment from a particular slave, for example, the slave 104e, for the duration of the piconet connection. When the Flush Timeout may expire, segments of an upper layer packet, which the ACL packet may belong to, may be flushed from a transceiver buffer and a new ACL packet may be generated and transmitted accordingly.

Each of the slave devices 104 may comprise suitable logic circuitry and/or code that may be Bluetooth compliant and may be enabled to operate as a slave of the piconet. Like the master device 102, each of the slave devices 104 may be integrated and/or communicatively coupled to a host device. The slave devices 104 may listen for each master transmission. In this regard, the intended slave such as the slave device 104a may view/decode the received ACL packet from the master device 102 over the channel 106 and may respond to the master device 102 with an acknowledgment packet for the duration of the piconet connection. In this regard, a positive acknowledgment (ACK) may indicate the slave 104a may have accepted the ACL packet and a negative acknowledgment (NAK) may indicate that the slave 104a may have denied the ACL packet received. The ACL packet transmitted over the ACL link may be secured by using a common authentication key and a common encryption key. The slave devices 104b, 104c, 104d, and 104e may view/decode the ACL packet addressed to the slave 104a. In this regard, the slave devices 104b, 104c, 104d, and 104e not addressed may respond the master device 102 to acknowledge the receptions of the ACL packet intended for the slave device 104a for the duration of the piconet. In this regard, each of the slave devices 104 may accept the ACL packet certain times for the duration of the piconet connection while corresponding uplink acknowledgment opportunities to the individual slave device may be assigned by the master device 102 only when none of positive acknowledgments may have been passed to the master device from the individual slave device.

In operation, the master device 102 may provide a multicast service by creating the channel 106 between the master device 102 and a particular slave device on the piconet, for example, the slave device 104a, and setting up an ACL link to support the channel 106. In this regard, a unique multicast channel identifier (M-CID) may be assigned to the channel 106 and the ACL link security may be ensured by supporting an authentication process and optionally an encryption process. The authentication key and the encryption key may be common and shared among the whole piconet. The traffic over the ACL link for the channel 106 may be encrypted with the common encryption key. The slave devices 104 may listen to each ACL packet transmitted over the ACL link of the channel 106 and view/decode the ACL packet addressed to the slave device 104a by using corresponding decryption key. The ACL packet may be acknowledged by each of the slave devices 104. In this regard, the ACL packet may be retransmitted until a positive acknowledgment may be received from each of the slave devices 104 or a Flush Timeout may be exceeded. In this regard, the master device 102 may provide opportunities to acknowledge the ACL packet associated the channel 106 only to the individual slave from which the master device 102 may not receive a positive acknowledgment (ACK) within the Flush Timeout period. After detecting a positive acknowledgment from each individual active slave devices 104 of the piconet, or the Flush Timeout may expire, the master device 102 may transmit a new ACL packet addressed to the slave devices 104 over the channel 106 and the process may continue.

Figure 2:
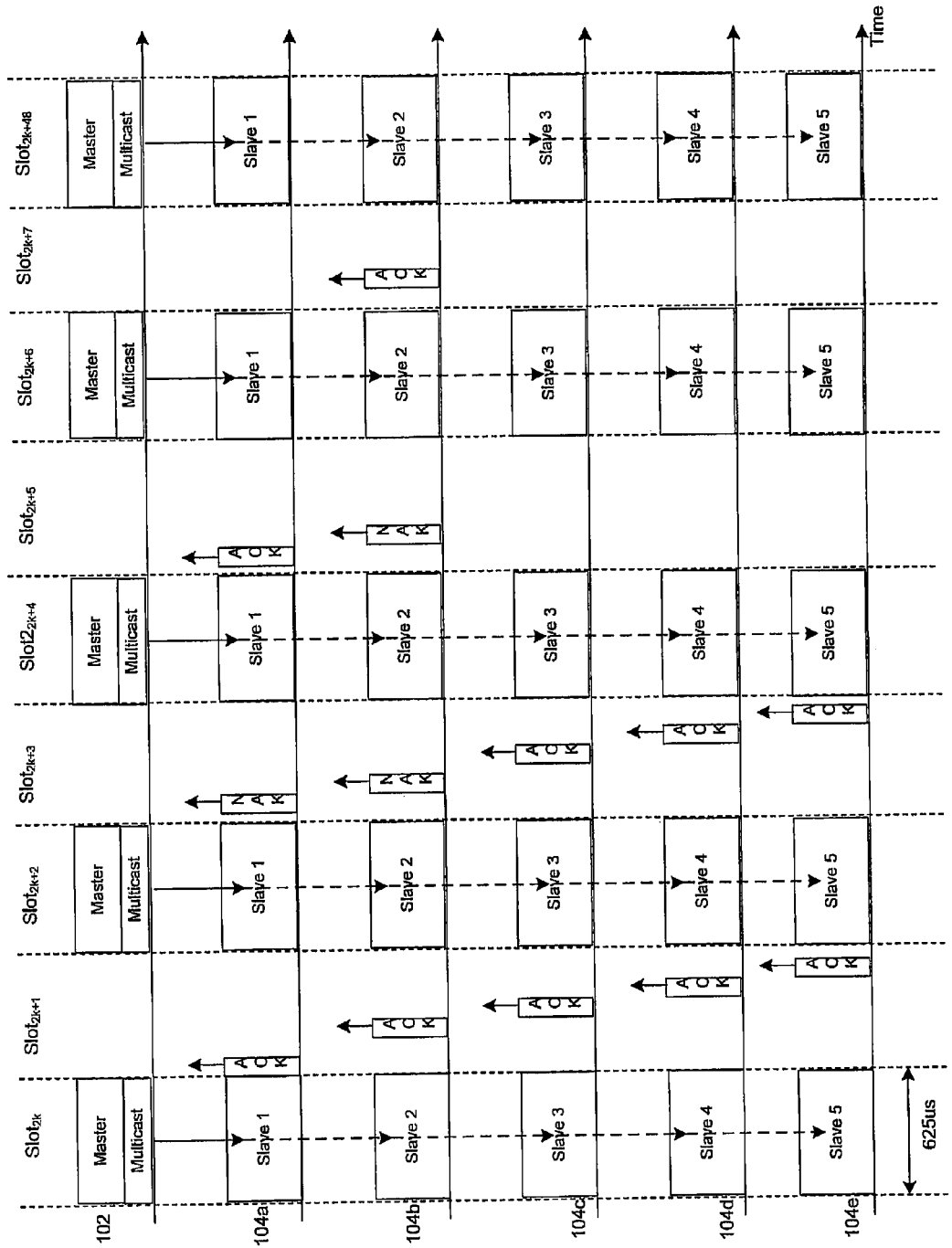
FIG. 2 is a diagram that illustrates exemplary transmission and retransmission for advertising Bluetooth multicast feature, in accordance with an embodiment of the invention.

FIG. 2 is a diagram that illustrates exemplary transmission and retransmission for advertising Bluetooth multicast feature, in accordance with an embodiment of the invention. Referring to FIG. 2, there is shown the master device 102 may send multicast ACL packets over a point-to-point connection such as the connection 106, and the slave devices may respond with ACK or NAK packets.

In FIG. 2, the master device 102 may transmit the first ACL packet addressed to a particular slave device such as the slave device 104a in the even numbered time slots, for example, the slot 2k, where k may be a time index number. The slave devices not addressed, for example, 104b, 104c, 104d, and 104e may eavesdrop or view the first ACL packet by using the common decryption key assigned by the master device 102. Uplink acknowledgment opportunities may be allocated in the odd numbered time slots, for example, the slot 2(k+1), such that the slave device 104 may transmit information to master device 102 during the time slot 2(k+1) to acknowledge receipt of the first ACL packet transmitted. In this regard, each of the slave devices 104 may be allocated a particular portion of the time slot 2k+1 to transmit an acknowledgment to master device 102 if it may accept the first ACL packet transmitted by the master device 102 in the preceding time slot 2k.

As illustrated in FIG. 2, the master device 102 may detect a positive acknowledgment (ACK) from each of the slave devices 104 in the corresponding portion of the time slot 2k+1 and store the acknowledgment information. In the time slot 2k+2, the second ACL packet may be generated and transmitted by the master device 102 over the ACL link of the channel 106 to the slave device 104a. Each of the slave devices 104 may be allocated a particular portion of the time slot 2k+3 to acknowledge the second ACL packet transmitted by the master device 102 in the preceding time slot 2k+2. In slot 2k+3, the slave device 104a and the slave device 104b may transmit a negative acknowledgment (NAK) to the master device 102. The master device 102 may detect a positive acknowledgment in the corresponding portion of the slot 2k+3 from each of slave devices 104 except for the slave 104a and the slave 104b. In this regard, the master device 102 may assign opportunities of acknowledging the second ACL packet only to the slave device 104a and the slave device 104b from which the master device 102 may not receive a positive acknowledgment of the second ACL packet in the slot 2k+3. The master device 102 may retransmit the second ACL packet intended to the slave device 104a in the next time slot 2k+4. The slave device 104a and the slave device 104b may view the second ACL packet by using the common decryption key and respond the master device 102 for acknowledging the received second ACL packet. The slave device 104a may accept the second ACL packet while the slave device 104b may reject the retransmitted second ACL packet. Accordingly, the slave device 104a may respond the master device 102 with an ACK while the slave device 104b may respond the master device 102 with a NAK in corresponding located portion in the available time slot, for example, the time slot 2k+5. The master device 102 may detect the ACK from the slave 104a and the NAK from the slave device 104b in corresponding located portion in the time slot 2k+5. The master device 102 may retransmit the second ACL packet addressed to the slave device 104a in the next available time slot such as the slot 2k+6, even though the slave device 104a may have already acknowledged the second ACL packet in the previous time slot 2k+5. Accordingly, the slave device 104b may view/decode the retransmitted second ACL packet and acknowledge the received second multicast packet in corresponding located portion in the time slot, for example, the slot 2k+7. The master device 102 may detect an ACK from the slave device 104b in corresponding located portion in the time slot 2k+7 and may continue the multicast process by generating and transmitting a new ACL packet addressed to the slave device 104a in the following available time slots, for example, the time slot 2k+8, and so on.

It is to be understood that the ACL packets may be in the form of Bluetooth signals and presented for the duration of the multicast ACL packets of one time slot. However, other types of signals and multicast ACL packet sizes, for example, size of 3 and 5 time slots, are also within the scope of the present invention.

Figure 3:
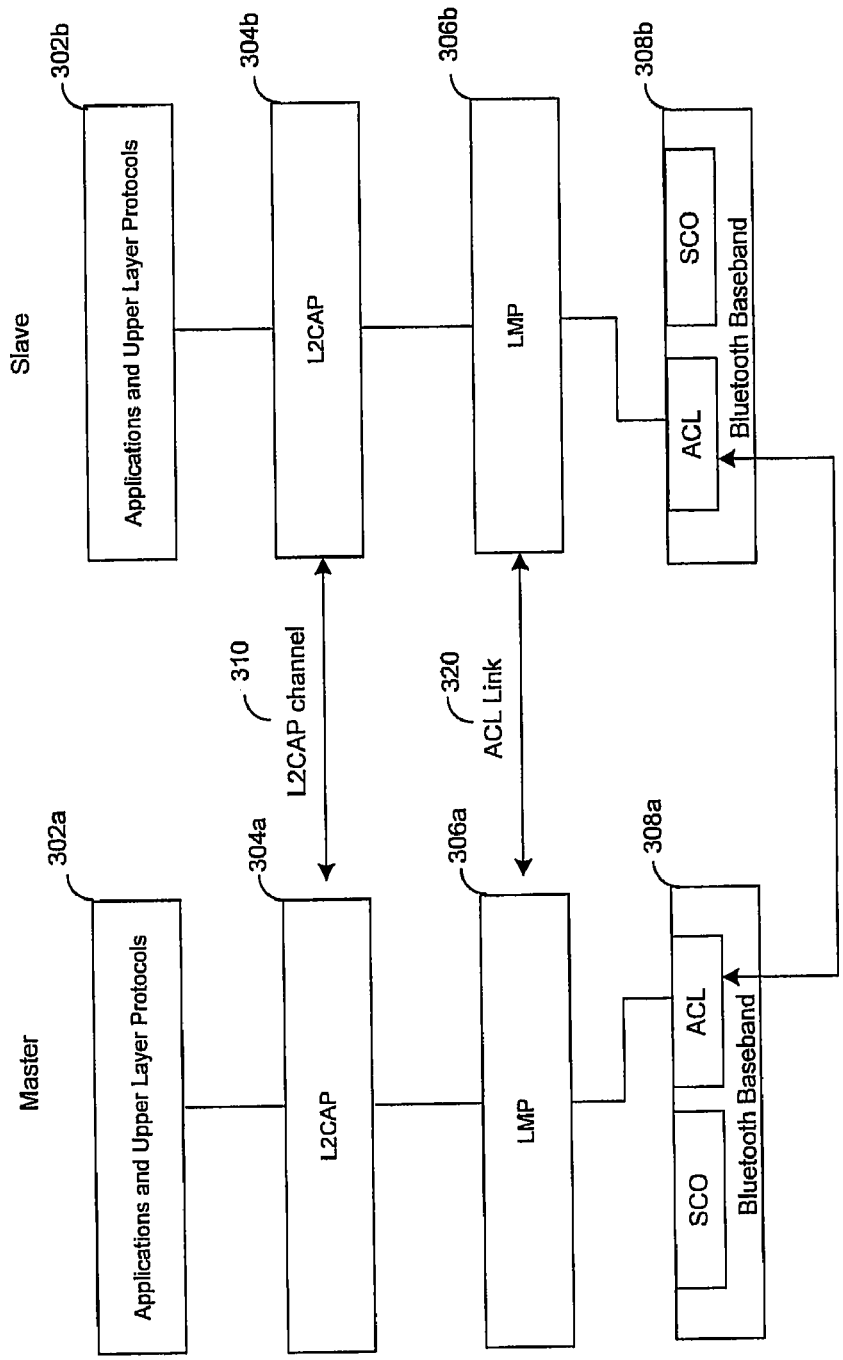
FIG. 3 is an exemplary Bluetooth protocol stack for advertising Bluetooth multicast feature, in accordance with an embodiment of the invention.

FIG. 3 is an exemplary Bluetooth protocol stack for advertising Bluetooth multicast feature, in accordance with an embodiment of the invention. Referring to FIG. 3, the exemplary Bluetooth protocol stack may comprise applications and higher protocol layers 302a, a logical link control and adaptation protocol (L2CAP) 304a, a link manager (LMP) 306a, and a Bluetooth Baseband 308a on the master side, and comprise applications and higher protocol layers 302b, a logical link control and adaptation protocol (L2CAP) 304b, a link manager (LMP) 306b, and a Bluetooth Baseband 308b on the slave side.

The applications and higher protocol layers 302a and 302b may comprise suitable logic and/or code that may be used selectively to enable different applications, including both legacy and new applications, and to exchange data using the Bluetooth wireless technology. The applications and higher protocol layers 302a and 302b may comprise Bluetooth specific protocols such as RFCOMM and SDP, and other adopted protocols.

The Bluetooth logical link control and adaptation protocol (L2CAP) 304a and 304b may comprise suitable logic and/or code that may support higher level protocol multiplexing, packet segmentation and reassembly, and the conveying of quality of service information. The L2CAP 304a and 304b may permit higher level protocols and applications to transmit and receive upper layer data packets (L2CAP Service Data Units, SDU) up to 64 kilobytes in length. The L2CAP 304a and 304b may also permit per-channel flow control and retransmission via the flow control and retransmission modes. Logical channels, named L2CAP channels, may be defined to operate over ACL links. The L2CAP channels may be connection-oriented or connectionless. A L2CAP channel may represent a data flow between L2CAP entities in Bluetooth devices. Each one of the end-points of an L2CAP channel may be identified by a two-octet channel identifier (CID).

The link manager protocol (LMP) 306a and 306b may comprise suitable logic and/or code that may enable link setup between Bluetooth devices. This protocol layer may cater to issues of security such like the act of authentication, and negotiation for encrypting the link, for example, generating, exchanging and checking the link and encryption keys. For authenticated devices, Bluetooth may allow for a whole piconet's traffic to be encrypted by encrypting traffic with a common encryption key for the whole piconet points. In that case devices in the piconet may view/decode traffic of the network including traffic not intended for them. The LMP 306a and 306b may also deal with control and negotiation of baseband packet sizes.

The Bluetooth baseband 308a and 308b may comprise suitable logic circuitry and/or code that may provide a mapping of logical channels onto physical channels, which may be defined over the time slot, each 625 μs in length and numbered according to the clock of the piconet master device 102. The Bluetooth baseband 308 may manage Bluetooth radio hardware and may be viewed as the Bluetooth link layer and part of the physical layer. The Bluetooth baseband 308a and 308b may define key procedures that enable Bluetooth devices to communicate with each other using the Bluetooth wireless technology. The Bluetooth baseband 308 may define the Bluetooth piconets and how they may be created. It also may define how the transmit resources may be shared among several devices in a piconet, as well as the low-level packet types. The Bluetooth baseband 308a and 308b may support an asynchronous connection-less (ACL) link for a packet-switched connection between the master device 102 and the active slaves 104 participating in the piconet. The ACL link may provide packet retransmission, and sequence members, as well as forward error correction (FEC) if necessary, to assure data integrity. A slave such as the slave 104a may be permitted to return an ACL packet on the slave-to-master slot if it has been addressed in the preceding master-to-slave slot. Some upper layer protocols, for example, the L2CAP 304a and 304b may be defined for only ACL links. The ACL link may be a best-effort link appropriate for asynchronous data transmissions.

In operation, at the master side, when a multicasting application may be provided by, for example, the master device 102 in the piconet, the master device 102 may need the L2CAP 304a to create a L2CAP channel 310 with a particular slave device, for example, the slave device 104a. The L2CAP channel 310 may be identified by an M-CID, which may be a determined unique channel identifier. Before the master device 102 may establish the L2CAP channel 310, the LMP 306 may first set up an ACL link that the L2CAP channel 310 may operate over by carrying out a number of baseband-specific actions, such as piconet creation, master-slave role assignments, and link configuration. The ACL link security may be configured by using LMP 306. The LMP 306 may perform negotiating encryption modes and coordinating encryption keys used by the master device 102 and the slave 104a. In this regard, a common authentication key may be assigned as the ACL link key. The common authentication key and optionally encryption key may be shared by the whole piconet points. In this regard, an ACL packet addressed to the slave device 104a may also be decoded by those no intended slave devices such as the slave devices 104b, 104c, 104d, and 104e.

In instances when the L2CAP 304a may receive an application packet from the applications and upper layer 302a, it may encode the received packet into a L2CAP packet. The L2CAP packet may be segmented into protocol data units such as the ACL packets that may be small enough for the lower-level protocol, and pass them to the LMP 306a. The LMP 306a may carry out authentication, link configuration and other protocols corresponding to the received ACL packets, accordingly. The master device 102 may encrypt the ACL packets with the common encryption keys and transmit the ACL packets over the link 320 to the slave 104a. Each of the ACL packets for an upper-level packet may be sent over the baseband before another packet may be sent to the same remote device. The baseband may send the ACL packets in order, using retransmit and timeouts as necessary, but notification of an application packet delivery depends on the implementation. In instances where reliability may be required, the L2CAP 304a may check the length field of the L2CAP packet header to determine if an application packet may have been transmitted successfully and then notify the application and upper level protocol 302a.

At the slave side, the LMP 306b may receive an ACL packet from the master device 102 over the link 320. The slave device, for example, 104a, may view/decode the received ACL packet by de-encrypting the ACL packet payload with the common encryption key and pass to the L2CAP 304b. The L2CAP 304b may reassemble the ACL packet to a L2CAP packet and then to the application and upper layers 302b. The authentication key and the corresponding encryption key for the ACL link between the master device 102 and the slave device 104a may be shared among the whole piconet points, and the ACL packet addressed to the slave device 104a may also be viewed/decoded by those no intended slave devices such as the slave devices 104b, 104c, 104d, and 104e. The received ACL packet may be viewed/decoded at the slaves 104. A corresponding acknowledgment ACL packet may be sent to the master device 102 from the slave 104a with an ACK for accepting the ACL packet and NAK for rejecting the ACL packet. When the ACL packet may be accepted at the slave device 104a, the accepted ACL packet may be passed to the L2CAP 304b to be reassembled to a L2CAP packet and then transmit the L2CAP packet to the application and upper layers 302b to form an application service data unit.

Figure 4:
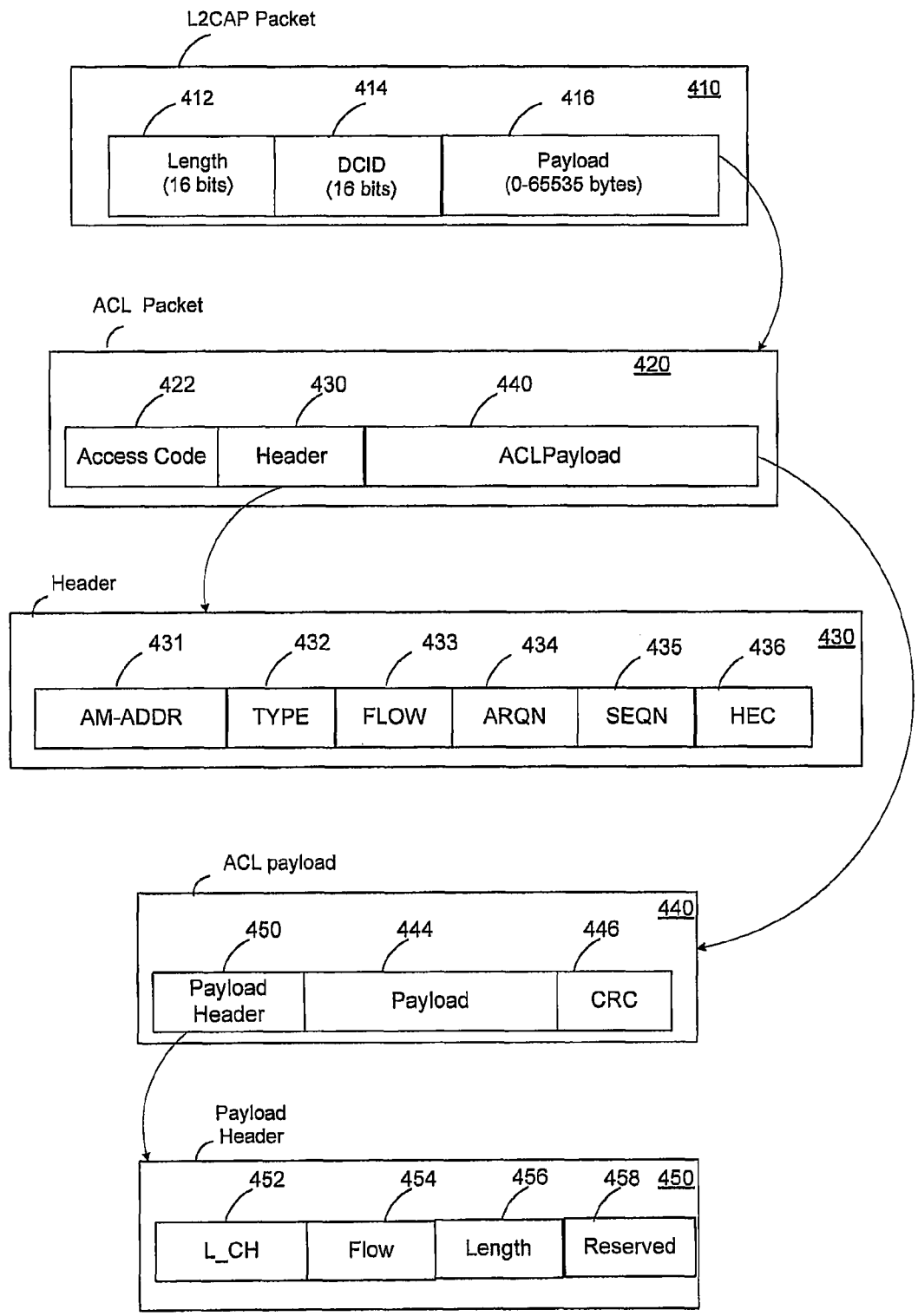
FIG. 4 is a diagram illustrating an exemplary Bluetooth packet, in accordance with an embodiment of the invention.

FIG. 4 is a diagram illustrating an exemplary Bluetooth packet, in accordance with an embodiment of the invention. Referring to FIG. 4, there is a L2CAP packet 410, an ACL packet 420, a header 430, an ACL payload 440, and a payload header 450.

The L2CAP packet 410 may comprise a Length field 412, a CID (channel identifier) field 414, and a Payload field 416. The Length field 412 may be used to indicate information on payload size per octet. The CID (channel identifier) field (two-octet length) 414 may provide information to specify a destination channel end point of the packet. The Payload field (0 to 65535-octet length) 416 may be used to store communication information received from the upper level protocols.

The Length field 412 and the CID field 414 may be combined and called an L2CAP header. The L2CAP packet 410 may be larger than a baseband packet, for example, an ACL packet, and need to be segmented into ACL packets 420 prior to transmission over the air and reassembled following their reception that may be small enough handled by the lower-level protocol.

The ACL packet 420 may comprise an access code (AC) field 422, a header field 430, and an ACL payload field 440. The access code (AC) field 422 may be used to detect the presence of a packet. The access code (AC) field 422 may be utilized to identify the packets as being from or to a specific master and distinguish transmissions in different piconets. The header field 430 may contain control information associated with the ACL packet 420 and the ACL link 320. The ACL payload field 440 may comprise a range from zero to a maximum of 2745 bits and contain user data and control information from higher layers.

The header field 430 may be comprise a AM-ADDR field 431, a TYPE field 432, a FLOW field 433, a ARQN field 434, a SEQN field 435, and a HEC field 436. The AM_ADDR field 431 may represent an active member address and it may be used to distinguish the active members participating on the piconet. The active member address may be assigned to each active slave. Packets exchanged between the master device 102 and the slave device like 104a may carry the AM_ADDR. That is, the AM_ADDR of the slave device may be used in both master-to-slave packets and the slave-to-master packets. The all-zero address may be reserved for broadcasting packets from the master to the slave devices 104. The TYPE field 432 may specify packet type. The FLOW field 433 may be used for flow control of packets over the ACL link. The ARQN field 434 may provide an indication for packet reception status at the slave 104. ARQN=1 may indicate that reception may have been done, while ARQN=0 may indicate that reception may not have been done normally, whereby posting it to the sender Bluetooth device, for example, the master device 102. The SEQN field 435 may be used for ACL packet retransmission ordering. The SEQN field 435 may provide a sequential numbering scheme to order the data packet stream. For each new transmitted packet that may contain data with CRC, the SEQN bit may be inverted. It may be required to filter out retransmissions at the destination; if retransmission may occur due to a failing ACK, the destination may receive the packet twice. By comparing the SQEN of consecutive packets, correctly received retransmissions may be discarded. The HEC field 436 may provide information for header error correction. The HEC 436 may be 8-bit header-error-check to check the header integrity.

The ACL payload 440 may comprise a payload header field 450, a payload field 444, and a CRC field 446. The payload header field 450 may comprise user data and control information from higher layers. The payload field 444 may comprise actual user data. The CRC field 446 may provide information on current ACL packet cyclic redundancy check. The CRC field 446 may be calculated over both the payload header field 450 and the payload field 444. The ACL payload field 440 may carry asynchronous data and may be encoded with an FEC with rate ⅔, or not encoded at all. The ACL payload field 440 may be protected with a 16-bit cyclic redundancy check (CRC).

The payload header 450 may comprise a L_CH (logical channel) field 452, a Flow field 454, a Length field 456, and a reserved field 458. The L-CH field 452 may indicate whether a payload may be start or continuation of an L2CAP message or an LMP message. For example, rate "10" may be set to the L_CH field 452 in the ACL packet comprising the first segment of the L2CAP packet, and rate "01" may be set to the L_CH field 452 in the ACL packets comprising the subsequent segment. The Flow field 454 may control data flow at L2CAP level. The Length field 456 may comprise a number of data bytes in the payload. The reserved field 458 may be reserved to be used for vendor specific applications.

In regard to a multicast service, the master device 102 may assign a unique M-CID in the DCID field 414 of the L2CAP packet 410 during connection establishment process with a particular slave such as 104a. The AM-ADDR field 431 in the header 430 may be assigned by the master device 102 with the unique M-CID. The transmission of the ACL packets may be encrypted by the master device with the common encryption key shared among the whole piconet. The transmitted ACL packets 420 intended FOR the slave 104a may be viewed/decoded by each of the active slaves 104 and responded with an acknowledgment packet from each of the slave devices 104. The master device 102 may retransmit the ACL packet 420 when ARQN=0 in the detected one or more acknowledgment packets or transmit a new ACL packet when ARQN=1 in detected acknowledgment packets from each of the slave devices 104 within the piconet.

Figure 5:
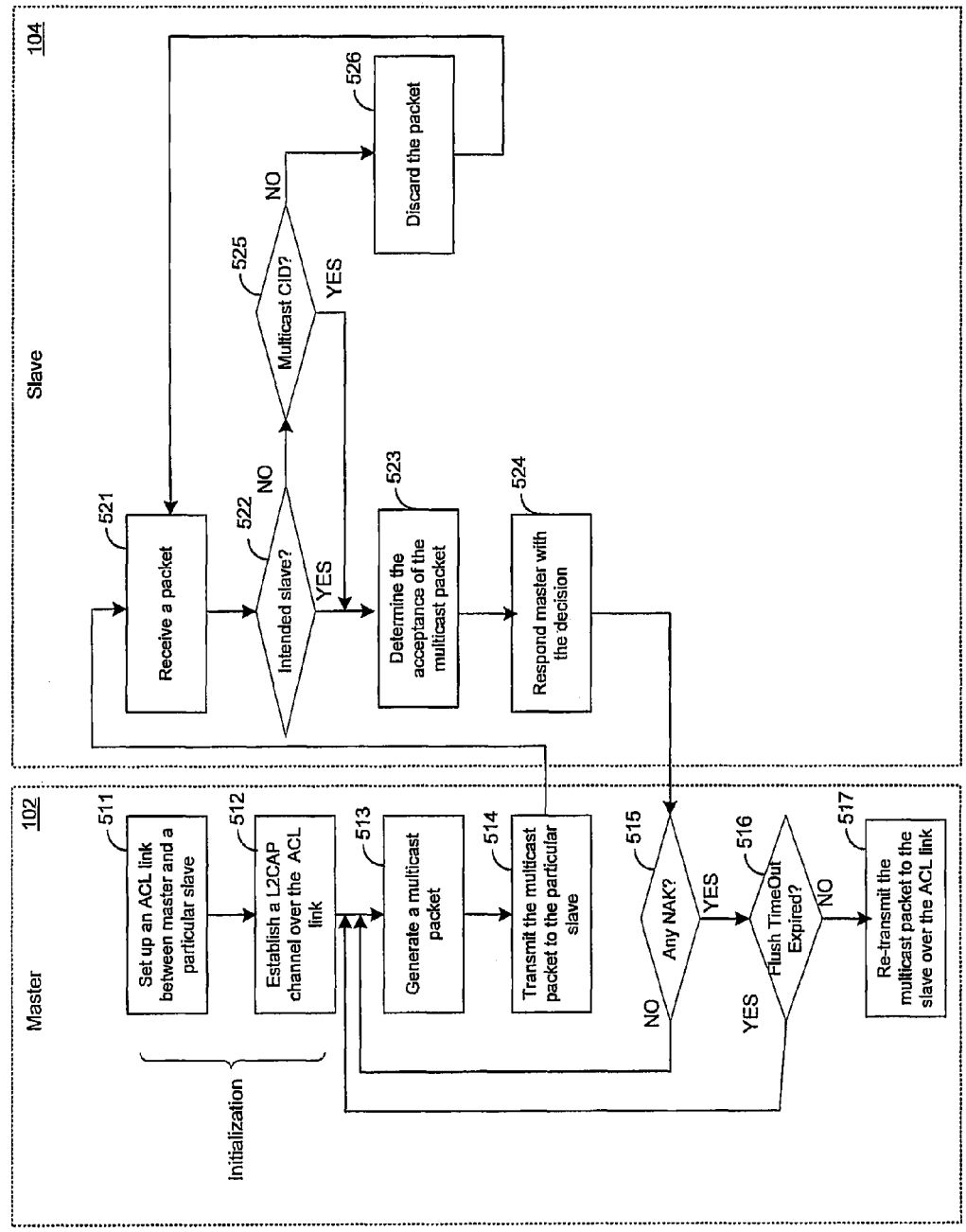
FIG. 5 is a flow chart that illustrates exemplary steps for advertising Bluetooth multicast feature, in accordance with an embodiment of the invention.

FIG. 5 is a flow chart that illustrates exemplary steps for advertising Bluetooth multicast feature, in accordance with an embodiment of the invention. Referring to FIG. 5, the master device 102 may provide a multicasting service to active slaves such as the slave devices 104 in the piconet where, for example, a temporary 3-bit address may be assigned to each active slave. In step 511, the master device 102 may set up an ACL link 320 with a particular slave, for example, the slave 104a. In this regard, the ACL link 320 may be configured by performing negotiating encryption modes and coordinating encryption keys used by the master device 102 and the slave 104a. The link authentication key may be replaced by a common link key shared among the whole piconet points.

In step 512, the L2CAP channel 310 may be established between the master device 102 and the slave 104a over the ACL link 320. In this regard, a multicast channel ID, which may be a determined and unique channel ID, may be assigned to the L2CAP channel 310 by the master device 102. In step 513, an ACL packet associated with a multicast application may be generated at the master device 102. The generated ACL packet 420 may have the AM_ADDR field 431 replaced by an assigned temporary active member address to the slave 104a. In step 514. The master device 102 may transmit the ACL packet over the ACL link 320. In this regard, the transmitted ACL packet 420 may be encrypted with a common encryption key derived from the common link key. In step 521, the slave devices 104 may receive a packet from the master device. In step 522, the AM_ADDR field in the received ACL packet header 430 may be checked to determine whether the slave device may be the intended recipient of the packet. In instances where the slave device may be the intended recipient of the received packet, for example, the slave device 104a, then in step 523, the corresponding slave device may determine whether the received multicast packet may be accepted. For example, a high error rate on the HCI field 436 may lead to the corresponding slave device failing to decode the ACL payload 440 of the received ACL packet 420 and hence reject the received packet.

In step 524, the corresponding slave device may respond the master device 102 with decisions by transmitting an acknowledgment packet to the master device 102 in a permitted portion of an available time slot for the particular slave device. In instances where the ACL packet 420 may be accepted at the corresponding slave device, the slave device may provide an indication to the master device 102, which may indicate that the reception of the ACL packet 420 was done. The slave device may provide the indication by setting ARQN=1 in its acknowledgment packet to the master device 102. In instances where the multicast packet may not be accepted normally at the slave device, the slave device may respond the master by setting the ARQN=0 in its acknowledgment packet to the master device 102.

In step 515, the master device 102 may check for a NAK in by determining whether the received acknowledgment packets indicated that one or more of the slave devices 104 may not accept the ACL packet 420. In instances where one or more acknowledgment packets with ARQN=0 may be received by the master device 102, then in step 516, the master may check whether the Flush Timeout may be expired. In instances where the Flush Timeout may not have expired, then in step 517, the master device 102 may retransmit the ACL packet 420 addressed to the slave device over the ACL link 320. In this regard, the retransmission may be addressed only to the slave 104a even if the slave 104a may have already claimed an acceptance of the ACL packet 420 and the rejection of the ACL packet 420 may be originated from other slave device. In step 522, in instances where the slave device, for example, slave device 104b may determine that it may not be the intended recipient of the received packet by checking the AM_ADDR field 431 in the received packet header, then in step 525, the slave device 104b may check whether the DCID field 414 of a L2CAP packet 410 may be that the ACL packet may belong to. In instances where the DCID field 414 may not be the multicast channel identifier, then in step 526, the received packet may be discarded. The exemplary steps may proceed to step 521. In step 525, in instances where the DCID field 414 may be the multicast channel ID, then the exemplary steps may proceed to step 523. In step 515, in instances where none acknowledgment packets with ARQN=0 may be identified at the master device 102, then the exemplary steps may proceed to step 513. In step 516, in instances where the Flush Timeout may be expired, then the exemplary steps may proceed to step 513.

Aspects of a method and system for Advertising Bluetooth Multicast Feature are provided. In accordance with various embodiments of the invention, a master device 102 in a Bluetooth piconet may provide a multicast service to active slave devices 104 during the piconet connection. In this regard, a Bluetooth data packet such as an ACL packet 420 transmitted from a master device 102 to a particular slave device, for example, the slave device 104a, may be received and acknowledged by each of the active slave devices 104 within the associated piconet including those slave devices that are not the intended recipient, for example, the slave devices 104b, 104c, 104d, and 104e. The master device 102 may detect each of the acknowledgments indicating a reception of the ACL packet 420 by each of the slave devices 104. The ACL packet 420 may be retransmitted to the slave device 104a over the ACL link 320 of the L2CAP channel 310 based on the detected acknowledgments from all the slave devices 104. The slave devices 104 may be distinguished by a temporary active member address (AM-ADDR) 431 assigned by the master device 102 during the piconet establishment.

The L2CAP channel 310 may be identified by a multicast channel identifier (M-CID), which may be vendor specific. The ACL link 320 over which the L2CAP channel 310 may operate may be secured by using a common authentication key shared among the devices in the piconet. The ACL packet 420 may be transmitted and/or retransmitted over the secured ACL link 320. The ACL packet 420 may comprise the channel identifier information. Each of the active slave devices 104 may examine the payload of the ACL packet 420 addressed specifically to the slave device 104a from the master device 102 over the secured ACL link 320 using a common decryption key. A negative acknowledgement detected by the master device 102 may cause a retransmission of the ACL packet 420 from the master device 102 to the slave 104a over the secured ACL link 320 of the L2CAP channel 310.

It is to be understood that the multicast data packets may be in the form of Bluetooth signals. However, other types of signals such as WiMAX signals are also within the scope of the present invention.

Another embodiment of the invention may provide a machine-readable storage, having stored thereon, a computer program having at least one code section executable by a machine, thereby causing the machine to perform the steps as described herein for advertising a Bluetooth multicast feature.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for wireless communication, the method comprising:
   transmitting from a master device, a multicast packet over a point-to-point connection established between said master device and a specific one of a plurality of slave devices, wherein said multicast packet comprises a single active member address that is assigned by said master device to said specific one of said plurality of slave devices; and
   detecting a plurality of receive acknowledgements, each responsive to said multicast packet and from one of said plurality of slave devices.

2. The method according to claim 1, comprising retransmitting said multicast packet over said point-to-point connection when an acknowledgment is not detected from each of the plurality of slaves.

3. The method according to claim 1, wherein said multicast data packet is a Bluetooth data packet.

4. The method according to claim 1, comprising identifying said point-to-point connection by a determined unique multicast channel identifier.

5. The method according to claim 1, comprising assigning a common authentication key to said point-to-point connection.

6. The method according to claim 1, wherein said plurality of slave devices belong to the same piconet.

7. The method according to claim 6, wherein each of said plurality of slave devices decodes a payload of said received multicast packet.

8. A method for wireless communication, the method of comprising:
  receiving from a master device over a point-to-point connection established between said master device and a specific one of a plurality of slave devices, a multicast data packet comprising a single active member address that is assigned by said master device to said specific one of a plurality of slave devices; and
  in response to said receiving of said multicast data packet, transmitting an acknowledgment packet from each of said plurality of slave devices to said master device.

9. The method according to claim 8, wherein said multicast data packet is a Bluetooth data packet.

10. The method according to claim 8, wherein said point-to-point connection is identified by a determined unique multicast channel identifier.

11. The method according to claim 8, wherein said point-to-point connection is assigned a common authentication key.

12. The method according to claim 8, wherein said specific slave and said plurality of slaves belong to the same piconet.

13. The method according to claim 8, comprising decoding a payload of received multicast packet.

14. A system for wireless communication, the system comprising:
  one or more circuits for use within a master device, wherein said one or more circuits enables transmission of a multicast packet over a point-to-point connection established between said master device and a specific one of a plurality of slave devices, wherein said multicast packet comprises a single active member address that is assigned by said master device to said specific one of said plurality of slave devices; and
  said one or more circuits enables detection of a plurality of receive acknowledgements, each responsive to said multicast packet and from one of said plurality of slave devices.

15. The system according to claim 14, wherein said one or more circuits enables retransmission of said multicast packet over said point-to-point connection when an acknowledgment is not detected from each of said plurality of slave devices.

16. The system according to claim 14, wherein said multicast data packet is a Bluetooth data packet.

17. The system according to claim 14, wherein said one or more circuits enables identification of said point-to-point connection by a determined unique multicast channel identifier.

18. The system according to claim 14, wherein said one or more circuits enables assignment of a common authentication key to said point-to-point connection.

19. The system according to claim 14, wherein said plurality of slave devices belong to the same piconet.

20. The system according to claim 14, wherein said one or more circuits enables each of said plurality of slave devices to decode a payload of said received multicast packet.

21. A system for wireless communication, the system comprising:
  one or more circuits for use in each of a plurality of slave devices, wherein said one or more circuits enables receiving from a master device over a point-to-point connection established between said master device and a specific one of a plurality of slave devices, a multicast data packet comprising a single active member address that is assigned by said master device to said specific one of a plurality of slave devices; and
  in response to said receiving of said multicast data packet, said one or more circuits enables transmission of an acknowledgment packet from each of said plurality of slave devices to said master device.

22. The system according to claim 21, wherein said multicast data packet is a Bluetooth data packet.

23. The system according to claim 21, wherein said one or more circuits enables identification of said point-to-point connection by a determined unique multicast channel identifier.

24. The method according to claim 21, wherein said one or more circuits enables assignment of a common authentication key to said point-to-point connection.

25. The method according to claim 21, wherein said plurality of slave devices belong to the same piconet.

26. The system according to claim 21, wherein said one or more circuits enables each of said plurality of slave devices to decode a payload of said received multicast packet.

* * * * *